Feb. 23, 1943.                    W. VAN TRIEST                    2,312,136
                          SEAM MARKING AND MEASURING DEVICE
                              Filed Aug. 31, 1940
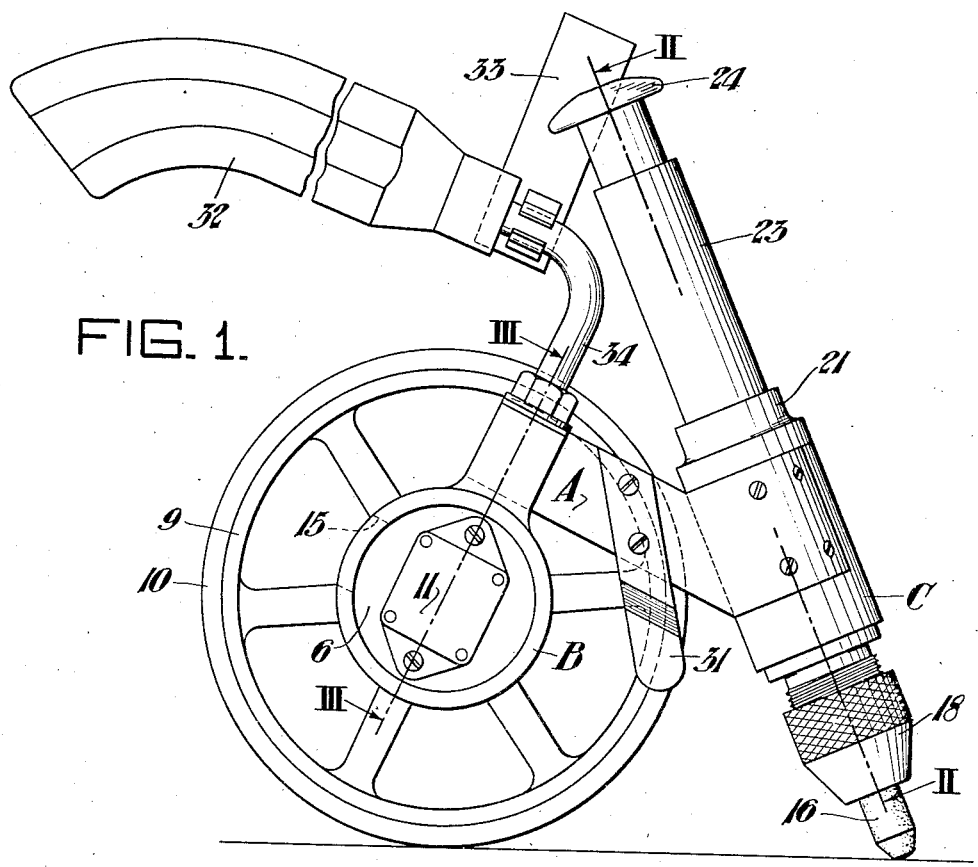
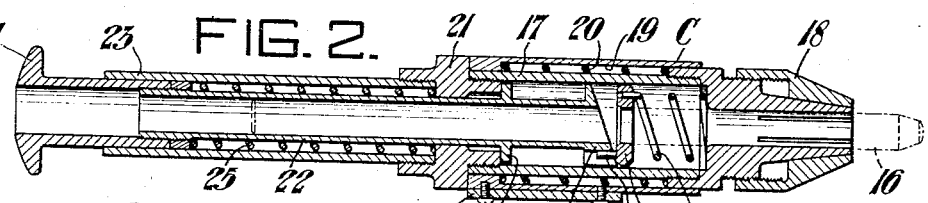
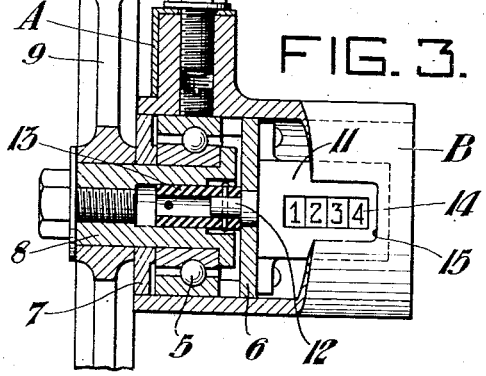
Inventor:
WILLIAM VAN TRIEST,
by: John E. Jackson
his Attorney.

Patented Feb. 23, 1943

2,312,136

UNITED STATES PATENT OFFICE 2,312,136

SEAM MARKING AND MEASURING DEVICE

William Van Triest, Pittsburgh, Pa.

Application August 31, 1940, Serial No. 355,046

5 Claims. (Cl. 91—12)

This invention relates to improvements in seam marking and measuring devices.

In the manufacture of steel blooms, billets and slabs, surface defects or seams are produced which must be removed before the steel is rolled into shape, so as to insure an unmarred surface and to prevent such defects from being rolled into the finished product.

The removal of such seams has become known as steel conditioning, and is generally accomplished by mechanical scraping or chipping, or scarfing by means of a gas torch. Any of the said methods requires semi-skilled labor, and the efficiency and economy of the operation depends largely upon supervision.

For example, it is necessary for an inspector to mark out the seams with some indicating mark so that the workers will readily see and remove sufficient metal to entirely eradicate the defects. Also, in plants employing a wage incentive plan of compensation, it is necessary to measure and record the total linear extent of the seam removal in order to base the workers' pay.

My invention contemplates an improved device for simultaneously marking and measuring the seams of blooms, billets and slabs prior to their conditioning.

It is a further object of my invention to provide a device of the character stated which is readily usable upon the uneven rough surfaces of the articles for which it is particularly intended, with accuracy and in a positive manner.

The invention also provides a unitary device of the character stated which is portable and balanced for ease of manipulation by the operator.

Additional objects and advantages will become apparent from the following description taken in connection with the accompanying drawing, wherein:

Fig. 1 is a side elevational view of a seam marking and measuring device embodying my invention;

Fig. 2 is a detail sectional view taken on the line II—II of Fig. 1, particularly showing the marking means; and Fig. 3 is a detailed sectional view taken on the line III—III of Fig. 1, particularly showing the measuring means.

Referring to the drawing, my improved device includes a main frame A, provided, as at one end thereof, with a depending bearing housing B. Spaced from said housing, and preferably at the other end portion of the frame, is a marker housing C secured to said frame.

The bearing housing B includes a horizontally disposed tubular or sleeve portion bored to receive a suitable bearing 5 between one end thereof and a partition wall 6 therein, 7 designating a retaining washer enclosing the bearing in the end of said housing.

Bearing 5 rotatably supports a shaft 8, which shaft extends beyond the housing B for attachment with a vertically disposed measuring wheel 9 in any suitable manner. Said wheel 9 is formed to have its circumference of unit measurement, as for example, equal to one foot, for measuring the work by rolling engagement of the wheel with the work. A rubber or other resilient tire or tread 10 is preferably provided on the wheel for positive non-slipping engagement with the work, said tire being formed to have unit circumference as stated.

For the purpose of registering or indicating the travel of the measuring wheel 9, I provide a revolution counter 11 of well known form, said counter or register having a projecting shaft 12 for the actuation thereof.

Said counter or register 11 is preferably mounted within the housing B, being secured to the partition wall 6 thereof by suitable screws or the like, and with its shaft 12 extending through said wall for connection with the wheel shaft 8. As preferred, the said connection may be provided by means of a flexible coupling 13 receiving the counter shaft 12 and telescoping with the wheel shaft 8, said coupling being secured to each of the shafts 8 and 12 by suitable pins as shown.

As is customary, the counter or register 11 is provided with a dial 14 visually indicating the number of revolutions of the counter shaft 12. A window 15 is provided in the housing B in alinement with said dial 14 to enable a view of the dial, said window facing toward the operator.

In order to mark the work traversed by the device, I provide a suitable marker, employing for example, the crayon 16 in common use in the mill for numbering, lettering and otherwise marking upon steel articles, said crayon preferably being mounted in a holder carried by the housing C in the following manner.

The housing C is of cylindrical form, bored to slidably receive a hollow sleeve 17 having a collet clutch 18 at the end thereof extending below and beyond said housing, the latter being counterbored at 19 for locating a spring 20 between the upper end of said housing and a shoulder on the collet clutch.

The upper end of the sleeve 17 is provided with an enlarged head 21 limiting the downward travel of said sleeve and clutch 18 by engagement with the upper end of the housing C as shown in Fig. 2.

A crayon magazine tube 22 extends upwardly beyond the housing C within a tubular casing 23 secured to the head 21, and is provided with a terminal push button 24 projecting outwardly beyond the casing 23. A spring 25 normally urges the tube 22 upwardly, said spring being enclosed within the casing 23 between the button 24 and the head 21.

Magazine tube 22 extends through the head 21 and within the sleeve 17, and is provided with a shoulder 26 limiting the outward travel of the tube 22 by spring 25, due to the engagement of said shoulder with the head 21.

The lower end of the tube 22 is provided with a transversely inclined head 27 longitudinally slotted to loosely receive the longitudinally extending pin 28 of a feed washer 29 positioned in front of said head and normally maintained transversely within the sleeve 17 by means of a spring 30 between said washer and the inner end of clutch 18.

It will be seen that I have thereby provided a coaxial assembly for receiving an elongated pencil or crayon 16, said crayon being inserted upwardly through the clutch 18, feed ring 29 and into magazine tube 22, whereupon the clutch 18 may be tightened to firmly hold the crayon therein. Upon pushing downwardly upon button 24, the feed ring 29 will be tilted by the inclined head 27, thereby causing the washer to grip and thrust the crayon 16 downwardly for proper adjustment of the free end thereof. In this manner, a crayon may be advanced to proper position as the end thereof becomes worn in use.

Since the relation of the crayon 16 and wheel 9 is fixed by their common frame A, they will simultaneously mark and measure the travel of the device as by contact of the crayon and wheel with the work, the counter or register 11 indicating the travel in terms of the revolution of the unit circumference of the wheel. A suitable leaf spring 31 is preferably mounted on the frame A for engaging the side of the wheel 9 to prevent free overtravel thereof.

Thus, the operator may mark and measure the total length of seams to be removed from steel blooms, billets and slabs, whereby the desired conditioning for the work may be charted and the rate of compensation for the workers may be determined.

For ease of manipulating and operating the device, I provide a handle or grip 32 secured to the frame A, said handle preferably having a clip 33 for attachment to the workers' belt for carrying the device about the mill.

It will be noted that the longitudinal axis of the crayon mounting means is preferably inclined forwardly and downwardly in front of the wheel 9 and in relation to the handle, whereby upon moving the device to the right as in Fig. 1, the pressure of the hand upon the grip 32 will insure contact of both the wheel and the crayon with the work. By adjustment of the crayon, a sufficient projection thereof may be provided whereby the pressure of said crayon upon the work will be against the spring 20, and in this manner, the crayon may follow surface variations on the work with the pressure of the spring providing a uniform marking by the crayon.

Various changes and modifications are contemplated within the scope of the following claims.

I claim:

1. In a marking device of the character described, a housing, a holder slidable therein for receiving and retaining a crayon, said holder including a clutch frictionally engaging the crayon, means for adjusting the position of the crayon in the clutch, and a spring between said holder and housing resiliently urging contact of the crayon and work upon displacement of the housing toward the work during the engagement thereof by the crayon.

2. In a marking device of the character described, a housing, a holder slidable therein for receiving and retaining a crayon, said holder including a clutch frictionally engaging the crayon, means reciprocable with respect to the clutch for selectively advancing the crayon in said clutch, and a spring between said holder and housing resiliently urging contact of the crayon and work upon displacement of the housing toward the work during the engagement thereof by the crayon.

3. In a marking device of the character described, a housing, a crayon holder including a sleeve slidable in the housing and having a collet clutch extending beyond one end of the housing for gripping a crayon inserted therein, a spring normally urging the sleeve and clutch away from said housing, means limiting said movement, and means for selectively advancing the crayon in the clutch.

4. In a marking device of the character described, a housing, a crayon holder including a sleeve slidable in the housing and having a collet clutch extending beyond one end of the housing for gripping a crayon inserted therein, a spring normally urging the sleeve and clutch away from said housing, means limiting said movement, a crayon magazine tube slidable in the sleeve, a feed washer in said sleeve, and means on the tube coacting with said washer to grip the crayon upon movement of the tube toward the clutch to advance the crayon in the latter.

5. In a marking device of the character described, a housing, a crayon holder therein including a sleeve slidable in the housing and having a collet clutch extending beyond one end of the housing for gripping a crayon inserted therein, a spring between the housing and sleeve normally urging the latter in the direction of the clutch, said sleeve having an abutment limiting such movement, a tubular casing extending from the other end of the housing, a crayon magazine tube slidably mounted in said sleeve and casing, a feed washer in the sleeve, means on the tube coacting with said washer to tilt the latter and grip the crayon upon movement of the tube toward the clutch, and means normally maintaining said washer in non-gripping position.

WILLIAM VAN TRIEST.